United States Patent

Souders et al.

[11] Patent Number: 6,063,460
[45] Date of Patent: May 16, 2000

[54] MOLDED POLYOLEFIN AND POLYPHENYLOXIDE PRODUCTS AND METHOD FOR PRODUCTION

[75] Inventors: John D. Souders, Jamestown; Peter J. Aretz, Edinboro, both of Pa.

[73] Assignee: Buffalo Molded Plastics, Inc., Troy, Mich.

[21] Appl. No.: 08/963,955

[22] Filed: Nov. 4, 1997

[51] Int. Cl.[7] ..................................................... B32B 5/18
[52] U.S. Cl. .......................... 428/31; 264/45.4; 428/159; 428/318.8; 428/424.6
[58] Field of Search ................... 428/31, 318.8, 428/159, 424.6; 264/45.4

[56] References Cited

U.S. PATENT DOCUMENTS

| | | | |
|---|---|---|---|
| 3,502,541 | 3/1970 | Hermitte et al. | 428/480 X |
| 3,773,875 | 11/1973 | Lammers | 264/46.7 |
| 3,808,689 | 5/1974 | Spinella | 433/60 |
| 4,286,001 | 8/1981 | Frau | 428/68 |
| 4,400,336 | 8/1983 | Thomas | 264/46.7 |
| 4,420,447 | 12/1983 | Nakashima | 264/46.7 X |
| 4,501,541 | 2/1985 | Bethell et al. | 264/46.6 X |
| 4,661,391 | 4/1987 | Schroder et al. | 428/159 |
| 4,734,230 | 3/1988 | Rhodes, Jr. et al. | 264/46.6 X |
| 4,753,586 | 6/1988 | Curtis | 264/46.6 X |
| 4,766,025 | 8/1988 | Sanok et al. | 428/159 |
| 4,793,784 | 12/1988 | Belleville et al. | 425/111 |
| 4,824,069 | 4/1989 | Shoji et al. | 249/91 |
| 5,069,838 | 12/1991 | Mori et al. | 264/46.6 |
| 5,429,742 | 7/1995 | Gutman et al. | 210/484 X |
| 5,474,841 | 12/1995 | Matsuki et al. | 428/318.8 X |
| 5,478,627 | 12/1995 | Hara et al. | 428/318.8 X |
| 5,608,957 | 3/1997 | Hanagan | 264/46.6 X |

FOREIGN PATENT DOCUMENTS

| | | |
|---|---|---|
| 0 583 542 | 2/1994 | European Pat. Off. . |
| 0 586 908 | 3/1994 | European Pat. Off. . |
| 36 04 175 | 8/1986 | Germany . |
| 196 19 892 | 6/1997 | Germany . |
| 197 54 180 | 6/1998 | Germany . |
| 58-171921 | 10/1983 | Japan . |
| WO 97/21766 | 6/1997 | WIPO . |

*Primary Examiner*—Henry F. Epstein
*Attorney, Agent, or Firm*—Rudnick & Wolfe

[57] ABSTRACT

Polyolefin and polyphenyloxide products such as products made using expanded polystyrene (EPS) or expanded polypropylene (EPP). A "foil" or "skin" of vinyl or other suitable decorative material is associated with the product to achieve a pleasing appearance and an otherwise satisfactory exterior surface. To make the product, the skin is positioned over the cavity of a female mold part. The mold is closed and, with or without vacuum assistance, the skin is brought into contact with the female mold surfaces during introduction of the plastic. This plastic is introduced in the form of small beads selected from the group consisting of polyolefin and polyphenyloxide beads which have been pre-expanded to a density reduction in the order of 75%. Air pressure is used to feed the beads into the mold cavity and steam is injected to soften the beads and to cause bonding thereof into an integral mass. In addition, the outer layer of beads is bonded to the foil whereby a one-piece part is removed from the mold. The invention also contemplates the addition of a frame structure to the one-piece finished part to facilitate attachment to a sheet metal door or other support. The frame may be positioned in association with the mold parts using fasteners of some sort. The frame is then integrated with the plastic part during a molding step and the part can then be readily attached to a sheet metal door or the like.

18 Claims, 3 Drawing Sheets

MOLDED POLYOLEFIN AND POLYPHENYLOXIDE PRODUCTS AND METHOD FOR PRODUCTION

BACKGROUND OF THE INVENTION

This invention relates to molded polyolefin and polyphenyloxide products and to methods for their production. The invention has application to the production of products of a variety of types but will be described with respect to vehicle parts, particularly parts of that type which are used in vehicle interiors and which therefore require a pleasing exterior appearance.

Parts of the type described may comprise, for example, panels which are attached on the inside of automobile doors. The doors typically are made of sheet metal and plastic panels are attached directly to the steel or other sheet metal support to achieve a pleasing interior appearance. U.S. Pat. No. 4,766,025 describes such products and a method for their manufacture. In the background section of the patent, reference is made to the formation of discrete plastic parts followed by assembly in a piece-by-piece manner during installation. The patent then goes on to describe a method wherein a vinyl sheet is stretched over a mold cavity, heated, and then pulled into the cavity using a vacuum. Moldable polyvinylchloride or polyurethane is then injected to form the part in one piece comprising the plastic body and the vinyl skin.

Attempts have also been made to make automobile door panels and other parts using expanded polystyrene. In this system, for example as reported in the March, 1996 issue of "Plastics Technology", an EPS part is first molded, a film of polystyrene is located in a mold along with the previously molded EPS part, and steam is introduced to bond the two materials together.

These prior art systems are characterized by certain disadvantages. Thus, parts made using injection molded PVC, polyurethane and the like are relatively heavy. The EPS parts are more lightweight but production methods are unduly complex leading to additional manufacturing costs. Furthermore, difficulties are encountered during installation of the EPS parts since the plastic is not sufficiently strong for use of screws and other fastening methods commonly used for assembly of the parts with a steel or other sheet metal door or the like.

SUMMARY OF THE INVENTION

This invention relates to polyolefin products such as products made using expanded polystyrene (EPS) or expanded polypropylene (EPP). Products made using polyphenyloxide are also within the scope of the invention. A "foil" or "skin" of vinyl or other suitable decorative material is associated with the product to achieve a pleasing appearance and an otherwise satisfactory exterior surface.

In the process of making the product, the skin is positioned over the cavity of a cavity die or female mold part. The mold is closed and, with or without vacuum or air pressure assistance, the skin is brought into contact with the female mold surfaces by the core or make mold part. The polyolefin or polyphenyloxide is introduced in the form of small beads which have been pre-expanded to a density reduction in the order of 75%. Air pressure is used to feed the beads into the mold cavity and steam is injected to soften the beads and to cause bonding thereof into an integral mass. In addition, the outer layer of beads is bonded to the foil whereby a one-piece part is removed from the mold.

The invention also contemplates, as an alternative, the addition of a frame structure to the one-piece finished part to facilitate attachment to a sheet metal door or other support. The frame may be added by means of an adhesive or using attaching means such as screws.

In a preferred form of the invention, the frame is positioned in association with the mold parts using fasteners of some sort to hold the frame in place. The frame is then integrated with the polyolefin or polyphenyloxide part during a molding step and the part can then be readily attached to a sheet metal door or the like.

DESCRIPTION OF THE PREFERRED EMBODIMENTS

Figure 1:
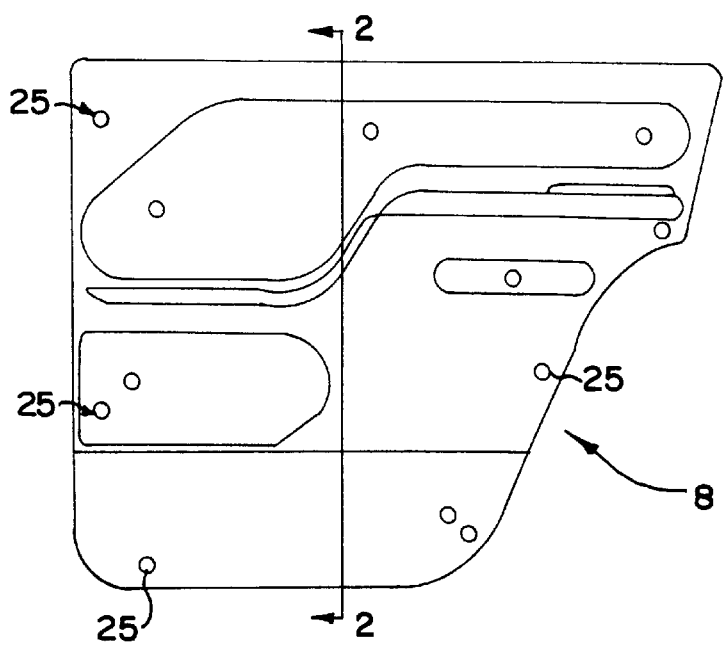
FIG. 1 is an elevational view of a molded door panel of the type contemplated by this invention.
Figure 2:
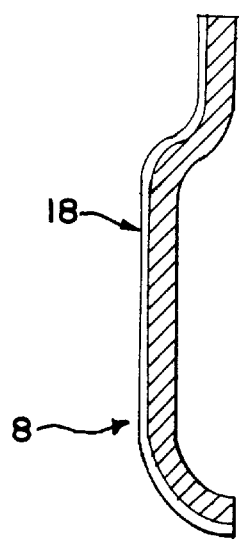
FIG. 2 is a cross-sectional view of the door panel taken about the line 2—2 of FIG. 1.
Figure 3:
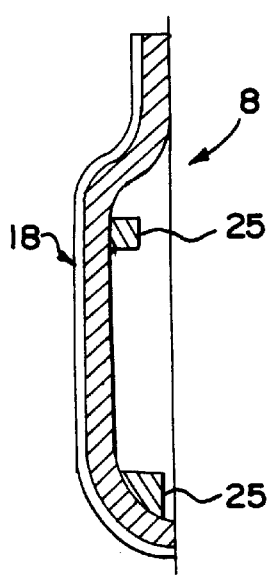
FIG. 3 is a cross-sectional view of the door panel illustrating the provision of in-molded panel attachment areas.
Figure 4:
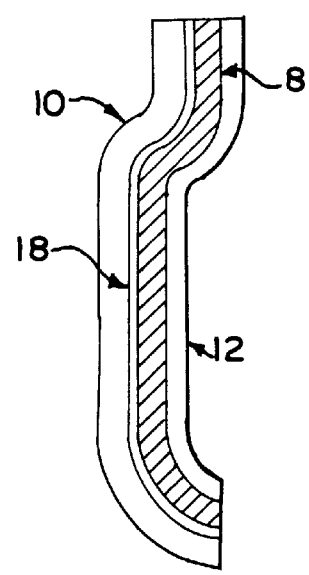
FIG. 4 is a cross-sectional view illustrating cavity and core parts in association with the molded part.
Figure 5:
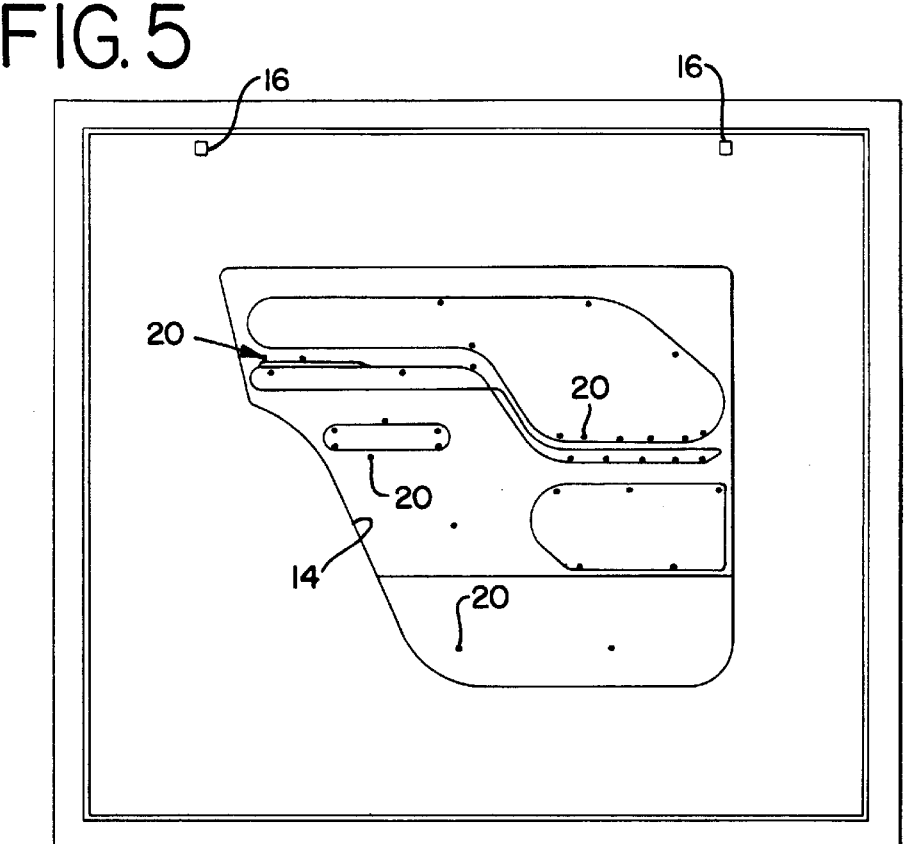
FIG. 5 is a front elevational view of the cavity side of the mold.
Figure 6:
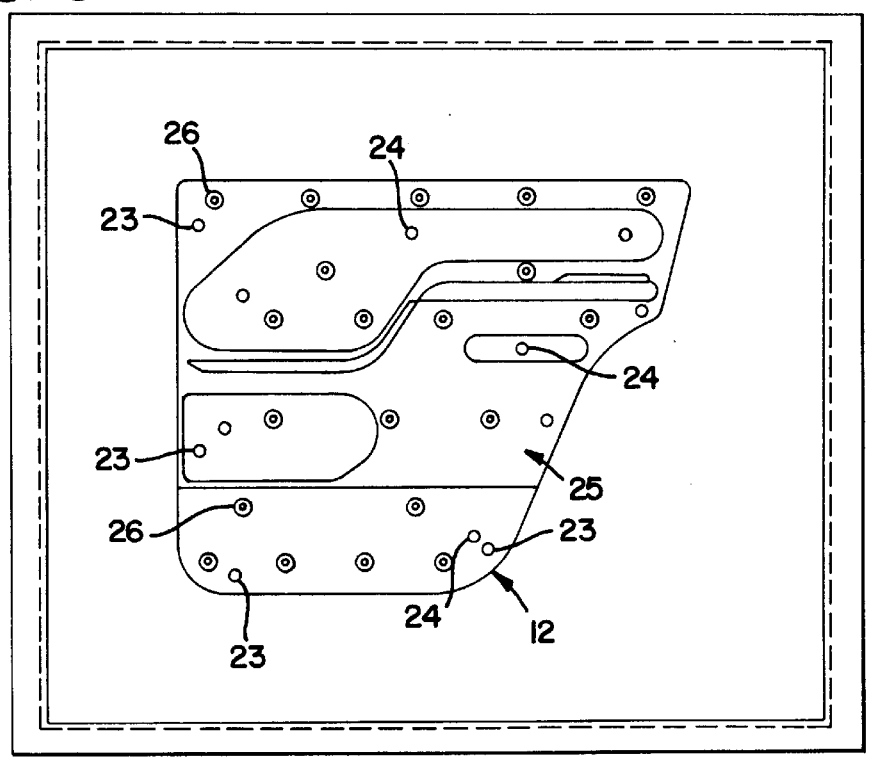
FIG. 6 is a front elevational view of the core side of the mold.

The drawings illustrate mold parts and products of the invention adapted to be produced using the mold parts. Specifically, a polyolefin or polyphenyloxide product 8 is shown in FIGS. 1–3 and cavity mold part 10 and male core part 12 are illustrated in FIGS. 4–7. The mold part 10 comprises a cavity 14 and, as best shown in FIG. 5, pins 16 are located at the top side thereof. These pins, or any other suitable means such as clips, Velcro®, or vacuum suction, are used for suspending a sheet 18 of the material which is to be used to form the outer surface of the polyolefin part to be produced. As noted, this may comprise vinyl but any other suitable foil material which will bond with the polyolefin or polyphenyloxide during molding is contemplated.

The surfaces of the cavity of the cavity mold part define a plurality of small openings 20 which communicate with a vacuum pump or other negative pressure device. When the cavity mold part is moved into position to seal the cavity, the negative pressure may be applied to cause the sheet 18 to conform to the surface of the cavity 14.

Core mold part 12 defines a surface 22 shaped to form the inside surface of the part. First openings 24 comprising conventional fill guns are positioned at spaced locations over the surface 22 and these openings communicate with a source of polyolefin or polyphenyloxide beads. An air pressure source is made available for introduction of the beads after the cavity is closed.

Figure 7:
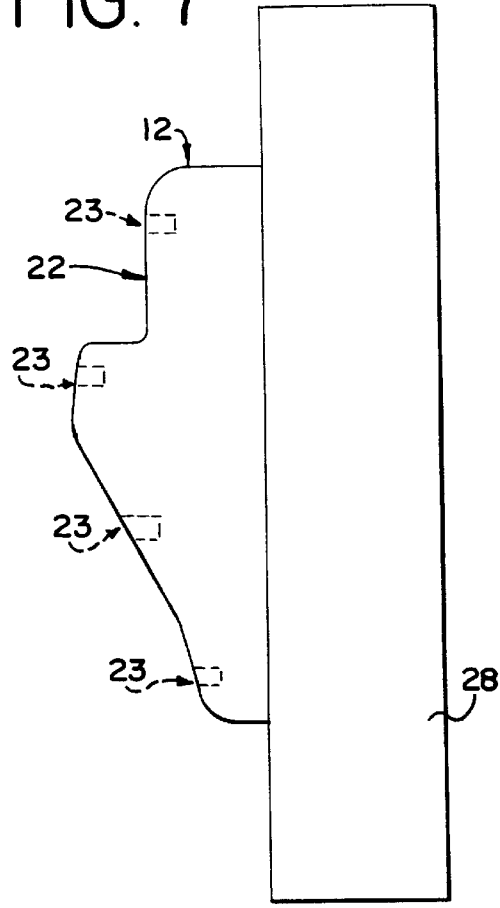
FIG. 7 is a side elevational view of the core side of the mold.

Additional openings 26 are formed in the surface 22 and these openings communicate with a steam chest 28. (FIG. 7). These openings may be of different sizes and shapes; for example, they may, in accordance with the known practice, comprise 20 small openings formed in ¼" diameter plugs which are fitted in the mold part. The opening size is such that steam can pass through but plastic will not pass back when negative pressure is applied. This steam is then available for softening of the beads and for bonding of the beads to each other, and for bonding of the sheet 18 to the beads adjacent thereto.

Bores or other depressions 23 are formed in the core mold part resulting in integrally formed studs or the like 25 in the molded products. (FIG. 3). These studs may take many forms and they serve as attachment means for securing the molded product to a sheet metal frame or the like.

The openings 26 in the core mold part surface and the openings 20 in the cavity mold part surface may also communicate with the air pressure source for use in clearing adjacent passages and also to assist in part release when desired. Suitable valving may be employed to selectively apply a negative pressure, introduce steam or apply air pressure.

In the production of a part in accordance with the invention, the mold part may be closed and steam introduced through openings 26 for preheating of the mold. The foil 18 is also preferably preheated. Where a vinyl sheet is utilized it is preheated to between 100° F. and 220° F. and then suspended over the cavity mold part 10 by means of pins 16 after opening the mold. Since the mold utilizes heating means, it is also contemplated that for at least some applications, the sheet could be pre-heated after the mold is closed.

The mold parts are heated by means of coils or other means common in the art. The non-fill side (the cavity side in the illustrated case) may be preheated to between 140° F. and 180° F. and the fill side to between 190° and 250° F. Negative pressure is preferably applied during or after closing of the mold to conform the sheet 18 to the mold surface. When the core mold part is closed, this will assist in conforming of the sheet and additional pressure may be applied by air pressure through openings 26 in the core mold part. This is particularly advantageous where the sheet 18 must conform to more complex surface configurations.

The beads are introduced through fill gun openings 24 in the core mold part under air pressure which is relatively low since compression of the beads is not intended. Once the beads are in place, air is evacuated through openings 26 by connecting them to a vacuum source. Air removal is critical to achieving bonding between beads and between beads and skin.

Steam is then introduced through openings 26 to soften the beads and to allow for bonding as described. Excess moisture may be removed through openings 26 by using valving to connect the openings to a vacuum source. In contrast with conventional molding using polyolefin beads, the steam introduction occurs from one side only since the sheet 18 blocks the passages defined by the female mold part. Steam pressure of 4 to 9 bar is typically employed.

The mold part surfaces are provided with a PTFE (Teflon®, for example) coating to facilitate release of the molded parts. It has also been found that this coating enhances conformation of the sheet 18 to the mold part surface since the sheet moves more easily over the surface when vacuum and/or other pressure is applied prior to introduction of the beads.

As an example of the preferred practice of the invention, the mold parts 10 and 12 are closed and preheated to 176° F. and 230° F., respectively. The cavity side is preheated to a lower temperature because the heating coils are associated with the core side having steam chest 28. (FIG. 7). Negative pressure is applied within the steam chest to draw excess heat from the cavity through openings 26.

A preheated vinyl sheet is suspended on the pins and the mold parts are again closed. This preferably involves a relatively slow early movement to gradually press the sheet into the cavity. Negative pressure is then applied to the cavity mold part whereby air is withdrawn from the cavity through openings 20. The sheet thereby is brought into conformance with the cavity surface and the mold is then completely closed.

Air pressure through openings is then applied through openings 26 in the core mold part to insure complete conformance of the skin to the cavity surfaces. Thereafter, fill guns introduce polyolefin beads through openings 24.

The mold is then purged of air and moisture by applying negative pressure through openings 26. As indicated, the removal of air is particularly necessary for achieving good bonding conditions. This is followed by pressure steaming (4 to 9 bar) through openings 26 which results in bonding of the beads to each other and the bonding of sheet 18 to the adjacent layer of beads.

Cooling occurs utilizing the core part passages by circulating coolant therein. After the molded part is stabilized, air pressure is applied through openings 26 to assist in part separation after mold opening begins.

Figure 8:
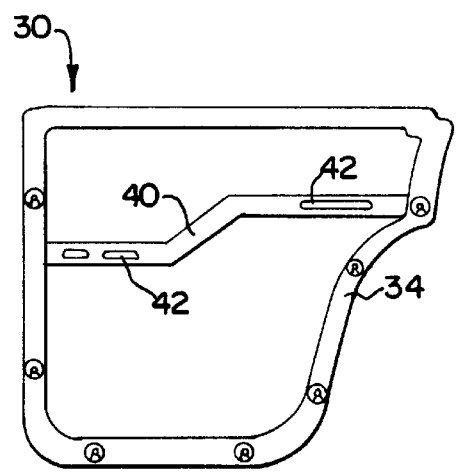
FIG. 8 is an elevational view of a frame structure employed in the practice of an alternative form of the invention.
Figure 9:
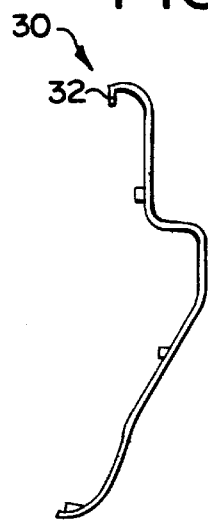
FIG. 9 is a side elevational view of the frame structure of FIG. 8.

FIGS. 8 and 9 show a support frame 30 which is designed for association with a part of the type contemplated by the invention. This part may be formed of metal or hard plastic having sufficient structural integrity for secure attachment to a sheet metal door or the like.

The frame 30 is shaped for use in association with a sheet metal door. The frame includes means for removable attachment to the door including hook flange 32 and elements 34 defining "keyways" for receiving pins with enlarged heads commonly associated with such a door. The elements 34 each include an enlarged lower opening for receiving an enlarged pin head, and an upper narrower slot for receiving the pin shank. These or any other conventional means for securing the frame to the door, including other forms of slots, holes and hooks, may be used.

The frame 30 includes a cross member 40 defining openings or other attachment means 42. These and variations thereof may be used for receiving ash trays, switch bezels, door handle, trim attachments, side impact absorbers, air bags, etc.

The frame 30 may be bonded to a polyolefin or polyphenyloxide part by use of an adhesive, staples, screws, pins, wiring, heat bonding or spin welding. It is also contemplated that the frame be mounted within the mold by temporary attachment to, for example, the core mold part 12 prior to introduction of the beads. In this case the frame will be formed of a material compatible with the beads such as polypropylene. Bonding of the part to the frame will then occur during the molding operation and a one-piece construction will result.

Figure 10:
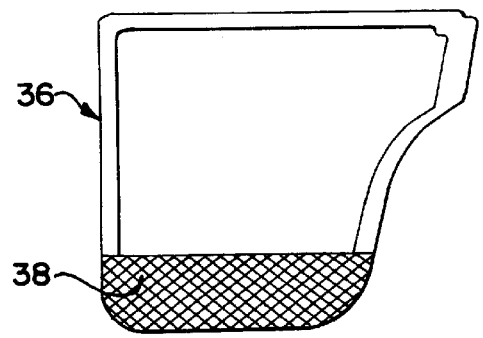
FIG. 10 is an elevational view of an additional alternative form of the practice of the invention.

FIG. 10 illustrates frame 36 with decorative piece 38, such as a carpet segment, attached thereto. In this embodiment, the part will be molded to conform to the upper part of the frame and the result will be a composite of a vinyl upper exterior surface and a carpeted lower surface. Many variations of this combination are possible.

It will be apparent that the configuration of the frame may take several forms relative to the polyolefin part. Thus, the polyolefin or polyphenyloxide part may be considered a decorative covering for the frame and the frame could be of various sizes and even coextensive with the inside of the part. The frame could wrap above, around, along the side of or under the part. Any exposed part of the frame could itself have a decorative finish to complement the part.

As noted, the skin 18 for the part may be vinyl but other materials bondable with the polyolefin or polyphenyloxide are contemplated including textiles, TPO, urethane, leather, paper or screen. It is also contemplated that the foil or skin be a non-compatible material which has a backing formed of one of the materials mentioned.

The polyolefin or polyphenyloxide part of the invention may include an integrated arm rest area which will have the desired shape and also a soft feel and soft side impact area provided by the polyolefin or polyphenyloxide. This and other areas of a part will thus have these features without the need for molding a separate part as would be the case where a hard plastic is employed.

The part may be readily molded with tubes, tunnels or channels integrally molded to provide room for wiring or for HVAC air flow. Cover flaps for such areas can also be readily molded with integral living hinges.

Because of the versatility of the parts and methods described, a panel component as much as 75% lighter than the commonly used parts is achieved with fewer production and assembly steps required. The polyolefin or polyphenyloxide has additional advantages due to being a better barrier against road noise and thermal transfer, and due to improved sound absorption to enhance interior sound systems. As noted, side impact management is also improved. In addition to labor savings, production efficiency is improved relative to injection molding since heat energy consumption is considerably reduced.

It will be understood that various changes and additions may be made in the concepts of the invention without departing from the spirit thereof particularly as defined in the following claims.

That which is claimed:

1. A method for producing a molded plastic product having a decorative skin, said method utilizing male and female mold parts defining interior surfaces forming a mold cavity corresponding to the desired shape of the product, and including openings in the mold parts communicating with the interiors thereof, means communicating with at least some of the openings for delivering plastic beads and steam to said cavity, and means communicating with at least some of the openings for applying a negative pressure to the said interiors, said method comprising the steps of positioning a sheet of the desired skin material in overlying relationship with respect to the interior of one mold part, closing said mold parts, conforming the sheet to the interior surface of said one mold part, delivering beads selected from the group consisting of polyolefin and polyphenyloxide beads to said cavity, applying negative pressure to the cavity to remove air from the cavity, delivering steam to the cavity to soften said beads and to cause bonding of the beads to one another and to cause bonding of said sheet to the beads adjacent said sheet, applying negative pressure to said cavity to remove excess moisture from said cavity, and thereafter removing said product from said cavity.

2. A method according to claim 1 including the step of applying negative pressure to the interior of said one mold part to cause said sheet to conform to said interior surface of said one mold part.

3. A method according to claim 1 wherein said sheet is moved toward said interior surface of said one mold part at least partially in response to closing of the mold parts after the step of positioning the sheet.

4. A method according to claim 1 including the step of preheating said sheet to a temperature between 100 and 220° F. before positioning the sheet relative to said one mold part.

5. A method according to claim 1 including means communicating with at least some of said openings for applying air pressure, and including the step of applying air pressure to said sheet to assist in conforming of said sheet to said interior surface of said one mold part.

6. A method according to claim 1 including the steps of preheating said one mold part to a temperature between 140 and 180° F. and preheating the other mold part to a temperature between 190 and 250° F., and thereafter delivering said beads to said cavity.

7. A method according to claim 1 including the step of coating said interior surfaces with polytetraflouroethylene.

8. A method according to claim 1 including the step of attaching a support frame to said plastic product.

9. A method according to claim 8 including the step of locating said support frame in said cavity before closing of same mold parts.

10. A molded plastic part produced in accordance with the method of claim 9.

11. A molded plastic part according to claim 10 wherein said support frame defines means for attaching the part to a sheet metal support.

12. A molded plastic part according to claim 11 comprising an interior panel for a vehicle, said sheet metal support being part of the vehicle.

13. A molded plastic part according to claim 11 including a decorative piece attached to said support frame when the support frame is being located in said cavity.

14. A molded plastic part according to claim 10 wherein said frame is formed of polypropylene.

15. A molded plastic part produced in accordance with the method of claim 1.

16. A molded plastic part according to claim 15 wherein said sheet comprises vinyl.

17. A molded plastic part according to claim 15 wherein said sheet comprises a composite of different materials, and wherein the sheet defines an interior surface adapted to bond with said beads.

18. A molded plastic part according to claim 15 including attachment means integrally molded to the part.

* * * * *